(No Model.)

P. SMITH.
DEVICE FOR PROTECTING BEDS FROM INSECTS.

No. 559,414.  Patented May 5, 1896.

Witnesses
N. R. Wood
Oliver B. T. Kaiser

Inventor
Peter Smith
By C. W. Mills
Attorney

UNITED STATES PATENT OFFICE.

PETER SMITH, OF CINCINNATI, OHIO.

DEVICE FOR PROTECTING BEDS FROM INSECTS.

SPECIFICATION forming part of Letters Patent No. 559,414, dated May 5, 1896.

Application filed September 9, 1895. Serial No. 561,962. (No model.)

*To all whom it may concern:*

Be it known that I, PETER SMITH, residing at Cincinnati, in the county of Hamilton and State of Ohio, have invented certain new and useful Improvements in Devices for Protecting Beds and Similar Articles from Insects, of which the following is a specification.

My invention relates to improved means for protecting beds and other furniture from insect vermin. Its object is to provide simple and effective means for protecting beds and similar articles of furniture from insect pests and which shall at the same time not be unsightly or inconvenient to maintain, all of which will be more fully set forth in the description of the accompanying drawings, forming a part of this specification, in which—

Figure 1:
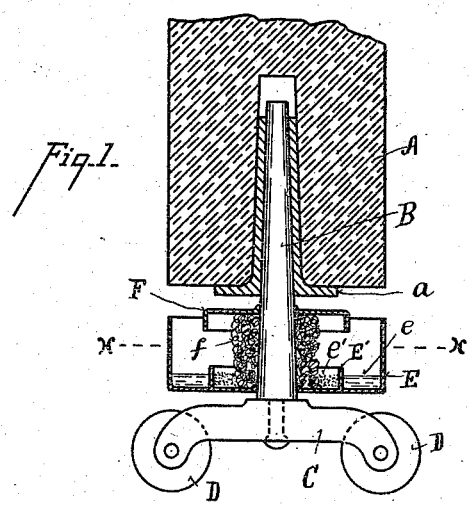
Figure 2:
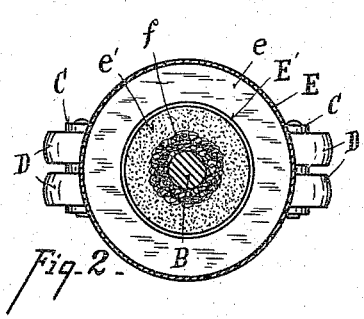
Figure 3:
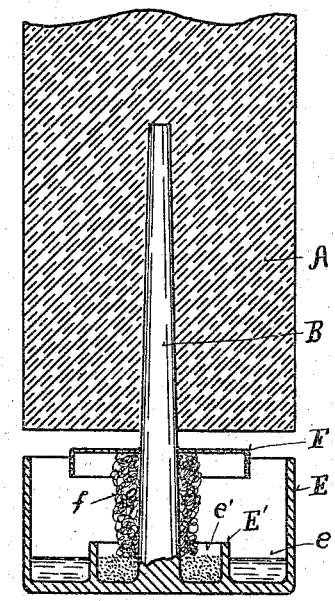

Figure 1 is a central vertical section through a bed-leg with my device attached thereto. Fig. 2 is a section on line $x\ x$, Fig. 1. Fig. 3 shows a modification in which the casters are omitted.

In the preferred form of construction, A represents the bed post or leg, to which is preferably secured a metallic socket $a$.

B represents a tapered shank seating rigidly in the socket $a$. To the lower end of shank B is swiveled a caster-frame C, carrying one or more rollers D. Seated upon the tapered shank B is a cup E, in the bottom of which is a raised annulus E', thereby dividing the bottom of the cup into two annular receptacles $e\ e'$.

F represents a cap likewise seating on the tapered shank B and of less diameter than the cup.

Mode of operation: One of my devices is provided for each leg of the bed. The annular receptacle $e$ is partially filled with oil or similar liquid which will not readily evaporate. Receptacle $e'$ is partially filled with flour, starch, chalk, or other similar pulverous material. Cotton or similar fibrous material $f$ is then preferably twisted around the shank B and held in place by the cap F. Thus if the insect succeeds in passing the annulus $e$ it is quickly covered and smothered by pulverous material of annulus $e'$ and prevented by the fibrous material $f$ from climbing the shank B, and causing the insect, if it still has sufficient vitality, to retrace its steps through the pulverous material and oil rather than to ascend the shank. The cup E may be made rectangular or circular to conform to the outline of the leg A, and when properly colored appears to be a continuation of the leg. It is inexpensive in construction, requires little attention, and effectually prevents any insect from gaining access to the bed by climbing the legs. An inferior modification would be to mount the cup E upon the leg of the bed instead of upon the shank B.

I claim—

1. In an insect-trap, the combination with a shank B adapted to be inserted in a furniture-leg, of the cup E carried by said shank and provided with an inner concentric annular flange E' forming two concentric receptacles $e, e'$, respectively containing a liquid and a pulverulent material, fibrous material surrounding the shank above the pulverulent material, and means for holding the fibrous material in place substantially as described.

2. In an insect-trap, the combination with a shank B adapted to be inserted in a furniture-leg, of the cup E carried by said shank and provided with an inner concentric annular flange E' of less height than the cup and forming two concentric receptacles $e, e'$, respectively containing a liquid and a pulverulent material, fibrous material surrounding the shank above the pulverulent material, and an inverted-cup-shaped cap F arranged on the shank above the fibrous material and operating to hold the latter in place.

In testimony whereof I have hereunto set my hand.

PETER SMITH.

Witnesses:
C. W. MILES,
OLIVER B. T. KAISER.